United States Patent
Shokri Razaghi et al.

(10) Patent No.: US 12,267,711 B2
(45) Date of Patent: Apr. 1, 2025

(54) METHOD FOR SWITCHING CONTROL CHANNEL MONITORING OF SEARCH SPACE SET GROUP

(71) Applicant: Telefonaktiebolaget LM Ericsson (publ), Stockholm (SE)

(72) Inventors: Hazhir Shokri Razaghi, Solna (SE); Havish Koorapaty, Saratoga, CA (US); Jung-Fu Cheng, Fremont, CA (US); Stephen Grant, Pleasanton, CA (US); Reem Karaki, Aachen (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 236 days.

(21) Appl. No.: 17/774,724

(22) PCT Filed: Nov. 6, 2020

(86) PCT No.: PCT/EP2020/081397
§ 371 (c)(1),
(2) Date: May 5, 2022

(87) PCT Pub. No.: WO2021/089857
PCT Pub. Date: May 14, 2021

(65) Prior Publication Data
US 2022/0394520 A1    Dec. 8, 2022

Related U.S. Application Data

(60) Provisional application No. 62/933,123, filed on Nov. 8, 2019.

(51) Int. Cl.
*H04W 24/08* (2009.01)
*H04W 74/00* (2009.01)
(Continued)

(52) U.S. Cl.
CPC ......... *H04W 24/08* (2013.01); *H04W 74/006* (2013.01); *H04W 74/0816* (2013.01); *H04W 74/0866* (2013.01)

(58) Field of Classification Search
CPC .............. H04W 24/08; H04W 74/006; H04W 74/0816; H04W 74/0866; H04W 72/23; H04W 16/14; H04L 5/0053
See application file for complete search history.

(56) References Cited

U.S. PATENT DOCUMENTS

2019/0132862 A1* 5/2019 Jeon ................... H04L 5/0098
2021/0144717 A1* 5/2021 Tsai ..................... H04W 8/24
(Continued)

FOREIGN PATENT DOCUMENTS

CN    105229938 A    1/2016
WO    2019143164 A1    7/2019

OTHER PUBLICATIONS

International Search Report and Written Opinion dated Jan. 20, 2021 for International Application No. PCT/EP2020/081397 filed Nov. 6, 2020, consisting of 15-pages.
(Continued)

*Primary Examiner* — Hashim S Bhatti
(74) *Attorney, Agent, or Firm* — Weisberg I.P. Law, P.A.

(57) ABSTRACT

A method, system and apparatus are disclosed for switching control channel monitoring of search space set group. According to one or more embodiments, a network node is provided. The network node includes processing circuitry configured to: configure a wireless device with at least two search space set groups, SSSGs; configure the wireless device to switch control channel monitoring between the at least two SSSGs; and optionally cause transmission of signaling on the control channel in accordance with the configured switching of the control channel monitoring.

17 Claims, 8 Drawing Sheets

(51) Int. Cl.
*H04W 74/08* (2009.01)
*H04W 74/0816* (2024.01)

(56) References Cited

U.S. PATENT DOCUMENTS

2022/0132342 A1* 4/2022 Kim ................ H04W 74/0816
2023/0269742 A1* 8/2023 Kuang .............. H04W 72/1263
370/329

OTHER PUBLICATIONS

3GPP TSG RAN WG1 #96bis R1-1904620; Title: Physical layer design of DL signals and channels for NR-U; Agenda Item: 7.2.2.1.2; Source: LG Electronics; Document for: Discussion and decision; Date and Location: Apr. 8-12, 2019, Xi'an, China, consisting of 8-pages.
3GPP TSG-RAN WG1 #98bis R1-1910945; Title: DL signals and channels for NR-U; Agenda Item: 7.2.2.1.2; Source: Ericsson; Document for: Discussion, Decision; Date and Location: Aug. 14-20, 2019, Chongqing, China, consisting of 24-pages.
3GPP TSG RAN WG1 #99 R1-1911721; Title: Summary of NR-U agreements till RAN1 #98; Agenda Item: 7.2.2; Source: Qualcomm Incorporated; Document for: FYI; Date and Location: Nov. 18-22, 2019, Reno, USA, consisting of 26-pages.
3GPP TSG RAN WG1 Meeting #98bis; Title: RAN1 Chairman's Notes; Date and Location: Oct. 14-20, 2019, Chongqing, China, consisting of 117-pages.
Korean Office Action and English Language Summary dated Dec. 9, 2024 for Application No. 2022-7019169, consisting of 8 pages.
3GPP TSG RAN WG1#98bis R1-1911261; Title: Feature lead summary for NR-U DL Signals and Channels; Agenda Item: 7.2.2.1.2; Source: Motorola Mobility, Lenovo; Document for: Discussion, Decision; Location and Date: Chongqing, China, Aug. 14-20, 2019, consisting of 31 pages.
Chinese Office Action and English machine translation dated Dec. 3, 2024 for Application No. 202080092361.7, consisting of 18 pages.
3GPP TSG RAN WG1 #98b R1-1910026; Title: Discussion on DL signals and channels for NR-U; Agenda Item: 7.2.2.1.2; Source: Spreadtrum Communications; Document for: Discussion and decision; Location and Date: Chongqing, China, Oct. 14-20, 2019, consisting of 6 pages.
3GPP TSG RAN WG2 NR AH1807 Meeting R2-1810008; Title: Remaining issues on DL BWP switching upon RACH procedure initiation; Agenda Item: 10.3.1.2; Source: Sharp; Document for: Discussion and decision; Location and Date: Montreal, Canada, Jul. 2-6, 2018, consisting of 4 pages.

* cited by examiner

METHOD FOR SWITCHING CONTROL CHANNEL MONITORING OF SEARCH SPACE SET GROUP

CROSS-REFERENCE TO RELATED APPLICATIONS

This application is a Submission Under 35 U.S.C. § 371 for U.S. National Stage Patent Application of International Application No.: PCT/EP2020/081397, filed Nov. 6, 2020 entitled "METHOD FOR SWITCHING CONTROL CHANNEL MONITORING OF SEARCH SPACE SET GROUP," which claims priority to U.S. Provisional Application No. 62/933,123, filed Nov. 8, 2019, entitled "METHOD FOR SWITCHING CONTROL CHANNEL MONITORING OF SEARCH SPACE SET GROUP," the entireties of both of which are incorporated herein by reference.

TECHNICAL FIELD

The present disclosure relates to wireless communications, and in particular, to methods and devices for switching control channel monitoring of a search space set group.

BACKGROUND

Mobile broadband may continue to drive the demands for big overall traffic capacity and huge achievable end-user data rates in the wireless access network. Several scenarios in the future may require data rates of up to 10 Gbps in local areas. These demands for very high system capacity and very high end-user date rates can be met by networks with distances between access nodes ranging from a few meters in indoor deployments up to roughly 50 meters in outdoor deployments, i.e., with an infra-structure density considerably higher than the densest networks of today. Reference is made herein to such networks as Third Generation Partnership Project (3GPP) New Radio (NR) systems (also called 5G). Besides traditional licensed exclusive bands, NR systems are also expected to be operating on unlicensed bands especially for enterprise solutions.

Numerology and Bandwidth Consideration for NR

Multiple numerologies are supported in NR. A numerology is defined by subcarrier spacing and cyclic prefix (CP) overhead. Multiple subcarrier spacings can be derived by scaling a basic subcarrier spacing by an integer $2^n$. The numerology used can be selected independently of the frequency band although it is assumed not to use a very small subcarrier spacing at very high carrier frequencies. Flexible network and wireless device (WD) (e.g., user equipment (UE)) channel bandwidth may be supported.

From a RAN1 specification perspective, maximum channel bandwidth per NR carrier is 400 MHz in 3GPP Release 15 (Rel-15). Note that all details for channel bandwidth at least up to 100 MHz per NR carrier may be specified in 3GPP Rel-15. At least for single numerology case, candidates of the maximum number of subcarriers per NR carrier may be 3300 or 6600 in 3GPP Rel-15 from a RAN1 specification perspective. NR channel designs may consider potential future extension of these parameters in later releases, allowing 3GPP Rel-15 wireless devices to have access to a NR network on the same frequency band in a later 3GPP release.

A subframe duration is fixed to 1 millisecond (ms) and frame length is 10 ms. Scalable numerology may allow at least from 15 kHz to 480 kHz subcarrier spacing (SCS). All numerologies with 15 kHz and larger subcarrier spacing, regardless of CP overhead, align on symbol boundaries every 1 ms in the NR carrier. More specifically, for the normal CP family, the following may be considered.

For subcarrier spacing of 15 kHz*$2^n$ (n is non-negative integer),
  Each symbol length (including CP) of 15 kHz subcarrier spacing equals the sum of the corresponding $2^n$ symbols of the scaled subcarrier spacing;
  Other than the first orthogonal frequency division multiplexing (OFDM) symbol in every 0.5 ms, all OFDM symbols within 0.5 ms have the same size;
  The first OFDM symbol in 0.5 ms is longer by 16 $T_s$ (assuming 15 kHz and FFT size of 2048) compared to other OFDM symbols;
  16 $T_s$ is used for CP for the first symbol;
For subcarrier spacing of 15 kHz*$2^n$ (n is a negative integer),
  Each symbol length (including CP) of the subcarrier spacing equals the sum of the corresponding $2^n$ symbols of 15 kHz.

NR CORSET Configuration

Among other things, a control resource set (CORESET) defines (1) the time duration (in OFDM symbols) of the CORESET which determines the time duration occupied by PDCCH and, (2) the frequency domain resources occupied by a physical downlink control channel (PDCCH). The current Rel-15 radio resource control (RRC) configuration includes the following:
  controlResourseSetId: ID of the CORSET;
  frequencyDomainResources: A bitmap indicating which groups of 6 contiguous physical resource blocks (PRBs) (RB groups) are allocated within a bandwidth part (BWP), i.e., the frequency domain resources used for the PDCCH. An RB group of 6 PRBs is also referred to as a control channel element (CCE);
  duration: The number of OFDM symbols in a CORESET, i.e., the time domain resources used for PDCCH, etc.

NR PDCCH Search Space (SS) Configuration

PDCCHs are organized as Search Spaces and each search space is associated with the CORESET. The current RRC configuration may include the following:
  controlResourceSetId: reference to the associated CORE-SET for the SearchSpace;
  monitoringSlotPeriodicityAndOffset: Slots for PDCCH Monitoring configured as periodicity and offset;
  duration: Number of consecutive slots that a SearchSpace lasts in every time domain monitoring occasion, i.e., upon every period as given in the periodicityAndOffset;
  monitoringSymbolsWithinSlot: Symbols for PDCCH monitoring in the slots configured for PDCCH monitoring (see monitoringSlotPeriodicityAndOffset). The most significant (left) bit represents the first OFDM symbol in a slot;
  nrofCandidates: Number of PDCCH candidates per aggregation level (AL); and
  searchSpaceType: Indicates whether this is a common search space (present) or a wireless device specific search space as well as downlink control information (DCI) formats for which to monitor.

NR in Unlicensed Spectrum (NR-U)

For a node (e.g., NR-U gNB/wireless device, Long Term Evolution License Assisted Access (LTE-LAA) eNB/wireless device, or WiFi access point/station (AP/STA)) to be allowed to transmit in unlicensed spectrum (e.g., 5 GHz band) the node typically performs a clear channel assessment (CCA). This procedure typically includes sensing the medium to be idle for a number of time intervals. Sensing the medium to be idle can be performed in different ways, e.g., using energy detection, preamble detection or using virtual carrier sensing. The latter implies that the node reads control information from other transmitting nodes informing when a transmission ends. After sensing the medium to be idle, the node is typically allowed to transmit for a certain amount of time, sometimes referred to as transmission opportunity (TXOP). The length of the TXOP depends on regulation and a type of CCA that has been performed, but typically ranges from 1 ms to 10 ms. This duration is often referred to as a COT (Channel Occupancy Time).

In Wi-Fi, feedback of data reception acknowledgements (ACKs) is transmitted without performing clear channel assessment. Preceding feedback transmission, a small duration (called SIFS) is introduced between the data transmission and the corresponding feedback which does not include actual sensing of the channel. In IEEE 802.11, the short interframe space (SIFS) period (16 μs for 5 GHz OFDM PHYs) is defined as: aSIFSTime=aRxPHYDelay+ aMACProcessingDelay+aRxTxTurnaroundTime, where:

aRxPHYDelay defines the duration used by the PHY layer to deliver a packet to the medium access control (MAC) layer;

aMACProcessingDelay defines the duration that the MAC layer uses to trigger the PHY layer transmitting a response; and/or aRxTxTurnaroundTime defines the duration to turn the radio from reception into transmit mode.

Therefore, the SIFS duration may be used to accommodate for the hardware delay to switch the direction from reception to transmission.

In 3GPP NR unlicensed bands (NR-U), a similar gap to accommodate for the radio turnaround time may be allowed. This may enable the transmission of physical uplink control channel (PUCCH) carrying uplink control information (UCI) feedback as well as PUSCH carrying data and possibly UCI within the same transmit opportunity (TXOP) acquired by the initiating network node (e.g., gNB). For example, the wireless device can transmit feedback without performing clear channel assessment before PUSCH/PUCCH transmission as long as the gap between downlink (DL) and uplink (UL) transmission is less than or equal to 16 us. When the gap between DL and UL is larger than 25 us, the wireless device can transmit feedback after 25 us CCA is successful. Operation in this manner is typically called "COT sharing."

NR Wideband Operation and LBT Bandwidth Pieces

Similar to NR, it is expected that NR-U will support transmissions with wide bandwidth, e.g., up to several hundreds of MHz bandwidth. However, there could be different radio technologies with different device's capabilities that simultaneously share the same spectrum. It is unlikely that a device will sense the channel free over the whole wide bandwidth, especially at high load. Thus, it may be beneficial for NR-U to support transmissions with dynamic bandwidth, in which the device can decide which part(s) of the supported bandwidth to use based on its listen-before-talk (LBT) outcome.

There are two common approaches for the device to use in wideband transmissions: carrier aggregation (CA) and single carrier wideband transmissions. In CA transmissions (similar to LTE-based LAA), the device performs LBT per component carrier (of, e.g., 20 MHz), then transmits on each component carrier (CC) in which LBT is successful. In single carrier wideband transmissions, the device performs LBT per LBT bandwidth piece/part (of 20 MHz) (also called an LBT bandwidth or LBT sub-band) and aggregates resources from each free LBT bandwidth piece in a single physical channel. FIG. 1 shows an example for the wideband operations using CA and single system carrier bandwidth of 80 MHz. Different wireless devices may operate on different maximum bandwidth sizes and transmit with different number of RBs depending on their LBTs outcomes. The diagrams consider only 80 MHz bandwidth; however, wideband operation can span more than 80 MHz through configuration of additional component carriers, either 20 MHz or wider, and the same principles as described above may apply.

In principle, if a large number of CORESETs can be configured, then separate CORESETs and search spaces may be configured for different LBT bandwidth pieces to ensure the availability of control signalling when at least one LBT bandwidth piece is available. In the example shown in FIG. 1(b), UE2 needs to monitor both CORESET2 and CORESET3 since the channel may be available only in LBT bandwidth piece 2 or only in LBT bandwidth piece 3. Similarly, wireless device 3 may monitor all four CORESETs to get its PDCCH. Furthermore, it is undesirable to configure a wide CORESET across LBT bandwidth pieces. Either the PDCCH is interleaved across the LBT bandwidth pieces or all PDCCH candidates are located in the available LBT bandwidth pieces when part of the channel is busy. Both results in loss of scheduling opportunities. Hence, there is no fundamental difference between the CA and wide BWP approaches in terms of number of CORESETs and search spaces to monitor by the wireless device. There is one difference, however, and that is with respect to wireless device capability. In 3GPP NR Release 15 (Rel-15), only up to 3 CORESETs can be configured.

Wireless Device Power Saving Mechanism

It may be recognized that the above designs for a wireless device to search for potential PDCCHs in several different LBT subbands is only necessary for the beginning portion of a channel occupancy time (COT) of a network node (e.g., gNB). This is because the network node (e.g., gNB) and wireless devices may not know in advance in which LBT subband(s) the LBT procedure will be completed successfully. Once the network node (e.g., gNB) finishes the LBT procedure and knows where the available subbands are, it may be desirable for the wireless devices to reduce the PDCCH monitoring locations to reduce power consumption after the beginning portion of a network node (e.g., gNB) COT.

Similar to the multiple monitoring locations in the frequency domain, it may also be beneficial in the beginning portion of a network node (e.g., gNB) COT that the wireless devices search for potential PDCCHs in several time locations (in addition to the beginning of a slot). This may allow the network node (e.g., gNB) to start transmitting user data to the wireless devices as soon as the LBT procedure is completed successfully. This is illustrated in FIG. 2 as an example. FIG. 2 illustrates an example of NR-U PDSCH and PDCCH transmissions and wireless device PDCCH monitoring. As described in the previous paragraph, it may also be desirable for the network node (e.g., gNB) to instruct the wireless device to switch to less frequent PDCCH monitoring patterns in time to achieve power saving.

Current Progress in 3GPP

In 3GPP RAN1 #98bis meeting, the following was considered in relation to dynamic switching of PDCCH monitoring search spaces:

Consideration:

A wireless device can be provided with at least two groups (For further study (FFS): more than two groups) of search space sets for PDCCH. The wireless device can be configured to switch between the groups, indicated based on at least the following alternatives (alt).

Alt 1: implicitly, e.g., after detection of [For Further Study (FFS): DL burst, (WB-)DM-RS, Group Common-PDCCH (GC-PDCCH) and/or PDCCH] and/or, e.g., based on information on COT structure.

Alt 2: explicitly in GC-PDCCH and/or PDCCH.

Search space sets that are not part of the configured groups (e.g., a common search space set) may always be monitored by the wireless device regardless of the search space set indication A single search space set can be part of more than one group.

It is up to RAN2 to optimize the signalling to minimize overhead.

Further, the following may be specified with regard to the indication of duration of the Channel Occupancy Time (COT):

Consideration: Add a COT duration bit-field per serving cell in GC-PDCCH, i.e., DCI format 2_0, The following may be configurable by RRC:
Presence of this bit-field;
Location of this bit-field in the DCI;
Length of this bit-field in the DCI;
FFS: Whether a single value will suffice in which case, the length is not configurable; and
Encoding of the bit field value, i.e., what COT duration corresponds to which bit-field value.

If a wireless device receives this bit-field, the wireless device may apply the knowledge about end-of-COT at least for the purpose of UL transmission LBT category switching in a gNB-acquired COT.

If this field is not present, the wireless device may use slot format indication (SFI) indication to determine end-of-COT (if SFI is available).

FFS: details for this SFI-based mechanism.

FFS: Whether the duration is encoded as, e.g., total length or remaining length.

FFS: Granularity of the signalled duration.

SUMMARY

Some embodiments advantageously provide methods, systems, and apparatuses for switching control channel monitoring of search space set group. In one embodiment, a network node is configured to configure the wireless device with at least two search space set groups (SSSGs); configure the wireless device with a timer for determining when to switch control channel monitoring between the at least two SSSGs; and optionally transmit signaling on the control channel in accordance with the configuration of the timer.

In one embodiment, a wireless device (WD) is configured to receive a configuration of at least two search space set groups (SSSGs); receive a configuration of a timer for determining when to switch control channel monitoring between the at least two SSSGs; monitor a first SSG of the at least two SSSGs; and one of switch to another of the at least two SSGs and continue monitoring the first SSG based at least in part on the timer.

According to one aspect of the disclosure, a method performed by a network node is provided. A wireless device is configured with at least two search space set groups, SSSGs. The wireless device is configured to switch control channel monitoring between the at least two SSSGs. Transmission of signaling on the control channel is optionally caused in accordance with the configured switching of the control channel monitoring.

According to one or more embodiments of this aspect, the configuring of the wireless device to switch control channel monitoring between the at least two SSSGs corresponds to configuring the wireless device with a timer for determining when to switch control channel monitoring between the at least two SSSGs where the switching is configured to occur based at least on an expiration of the timer. According to one or more embodiments of this aspect, the configuring of the wireless device to switch control channel monitoring between the at least two SSSGs further comprises an indication that triggers the start of the timer and is an instruction to monitor one of the at least two SSSGs.

According to one or more embodiments of this aspect, a value of the timer is based at least on one of a duration of a channel occupancy time, COT, a duration of a slot format and a periodicity of group common physical downlink control channel, GC-PDCCH. According to one or more embodiments of this aspect, the configuring of the wireless device to switch control channel monitoring between the at least two SSSGs corresponds to an indication for switching control channel monitoring. According to one or more embodiments of this aspect, the indication for switching control channel monitoring is based at least on signaling downlink control information, DCI, format 2_0.

According to one or more embodiments of this aspect, the indication for switching control channel monitoring is based at least on a value of a bit field in the DCI format 2_0. According to one or more embodiments of this aspect, the bit field in the DCI format 2_0 indicates to monitor a first SSSG of the at least two SSSGs based at least on the value of the bit field being equal to 0. According to one or more embodiments of this aspect, the bit field in the DCI format 2_0 indicates to monitor a second SSSG of the at least two SSSGs based at least on the value of the bit field being equal to 1. According to one or more embodiments of this aspect, the configuring of the wireless device with at least two SSSGs includes: determining a timing for the wireless device to switch control channel monitoring between the at least two SSSGs; and signaling the indication to the wireless device, the indication being based on the determined timing for the wireless device.

According to another aspect of the disclosure, a method performed by a wireless device is provided. A configuration of at least two search space set groups, SSSGs is received. A configuration for switching control channel monitoring between the at least two SSSGs is received. Switching to one of the at least two SSSGs for control channel monitoring is performed in accordance with the configuration for switching control channel monitoring between the at least two SSSGs.

According to one or more embodiments of this aspect, the configuration for switching control channel monitoring between the at least two SSSGs corresponds to a configuration for a timer for determining when to switch control channel monitoring between the at least two SSSGs where the switching is configured to occur based at least on an expiration of the timer. According to one or more embodiments of this aspect, the configuration control channel monitoring between the at least two SSSGs comprises an indication that triggers the start of the timer and is an instruction to monitor one of the at least two SSSGs. According to one or more embodiments of this aspect, a value of the timer is based at least on one of a duration of a channel occupancy time, COT, a duration of a slot format and a periodicity of group common physical downlink control channel, GC-PDCCH.

According to one or more embodiments of this aspect, the configuration for switching control channel monitoring between the at least two SSSGs corresponds to an indication to switch control channel monitoring. According to one or more embodiments of this aspect, the indication to switch control channel monitoring is based at least on detection of downlink control information, DCI, format 2_0. According to one or more embodiments of this aspect, the indication to switch control channel monitoring is based at least on a value of a bit field in the DCI format 2_0.

According to one or more embodiments of this aspect, the bit field in the DCI format 2_0 indicates for the wireless device to monitor a first SSSG of the at least two SSSGs based at least on the value of the bit field being equal to 0. According to one or more embodiments of this aspect, the bit field in the DCI format 2_0 indicates for the wireless device to monitor a second SSSG of the at least two SSSGs based at least on the value of the bit field being equal to 1.

According to another aspect of the disclosure, a network node is provided. The network node includes processing circuitry configured to: configure a wireless device with at least two search space set groups, SSSGs; configure the wireless device to switch control channel monitoring between the at least two SSSGs; and optionally cause transmission of signaling on the control channel in accordance with the configured switching of the control channel monitoring.

According to one or more embodiments of this aspect, the configuring of the wireless device to switch control channel monitoring between the at least two SSSGs corresponds to configuring the wireless device with a timer for determining when to switch control channel monitoring between the at least two SSSGs where the switching is configured to occur based at least on an expiration of the timer. According to one or more embodiments of this aspect, the configuring of the wireless device to switch control channel monitoring between the at least two SSSGs further comprises an indication that triggers the start of the timer and is an instruction to monitor one of the at least two SSSGs. According to one or more embodiments of this aspect, a value of the timer is based at least on one of a duration of a channel occupancy time, COT, a duration of a slot format and a periodicity of group common physical downlink control channel, GC-PDCCH.

According to one or more embodiments of this aspect, the configuring of the wireless device to switch control channel monitoring between the at least two SSSGs corresponds to an indication for switching control channel monitoring. According to one or more embodiments of this aspect, the indication for switching control channel monitoring is based at least on signaling downlink control information, DCI, format 2_0. According to one or more embodiments of this aspect, the indication for switching control channel monitoring is based at least on a value of a bit field in the DCI format 2_0.

According to one or more embodiments of this aspect, the bit field in the DCI format 2_0 indicates to monitor a first SSSG of the at least two SSSGs based at least on the value of the bit field being equal to 0. According to one or more embodiments of this aspect, the bit field in the DCI format 2_0 indicates to monitor a second SSSG of the at least two SSSGs based at least on the value of the bit field being equal to 1. According to one or more embodiments of this aspect, the configuring of the wireless device with at least two SSSGs includes: determining a timing for the wireless device to switch control channel monitoring between the at least two SSSGs; and signaling the indication to the wireless device, the indication being based on the determined timing for the wireless device.

According to another aspect of the disclosure, a wireless device is provided. The wireless device includes processing circuitry configured to: receive a configuration of at least two search space set groups, SSSGs; receive a configuration for switching control channel monitoring between the at least two SSSGs; and switch to one of the at least two SSSGs for control channel monitoring in accordance with the configuration for switching control channel monitoring between the at least two SSSGs.

According to one or more embodiments of this aspect, the configuration for switching control channel monitoring between the at least two SSSGs corresponds to a configuration for a timer for determining when to switch control channel monitoring between the at least two SSSGs where the switching is configured to occur based at least on an expiration of the timer. According to one or more embodiments of this aspect, the configuration for switching control channel monitoring between the at least two SSSGs comprises an indication that triggers the start of the timer is an instruction to monitor one of the at least two SSSGs. According to one or more embodiments of this aspect, a value of the timer is based at least on one of a duration of a channel occupancy time, COT, a duration of a slot format and a periodicity of group common physical downlink control channel, GC-PDCCH.

According to one or more embodiments of this aspect, the configuration for switching control channel monitoring between the at least two SSSGs corresponds to an indication to switch control channel monitoring. According to one or more embodiments of this aspect, the indication to switch control channel monitoring is based at least on detection of downlink control information, DCI, format 2_0. According to one or more embodiments of this aspect, the indication to switch control channel monitoring is based at least on a value of a bit field in the DCI format 2_0.

According to one or more embodiments of this aspect, the bit field in the DCI format 2_0 indicates for the wireless device to monitor a first SSSG of the at least two SSSGs based at least on the value of the bit field being equal to 0. According to one or more embodiments of this aspect, the bit field in the DCI format 2_0 indicates for the wireless device to monitor a second SSSG of the at least two SSSGs based at least on the value of the bit field being equal to 1.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
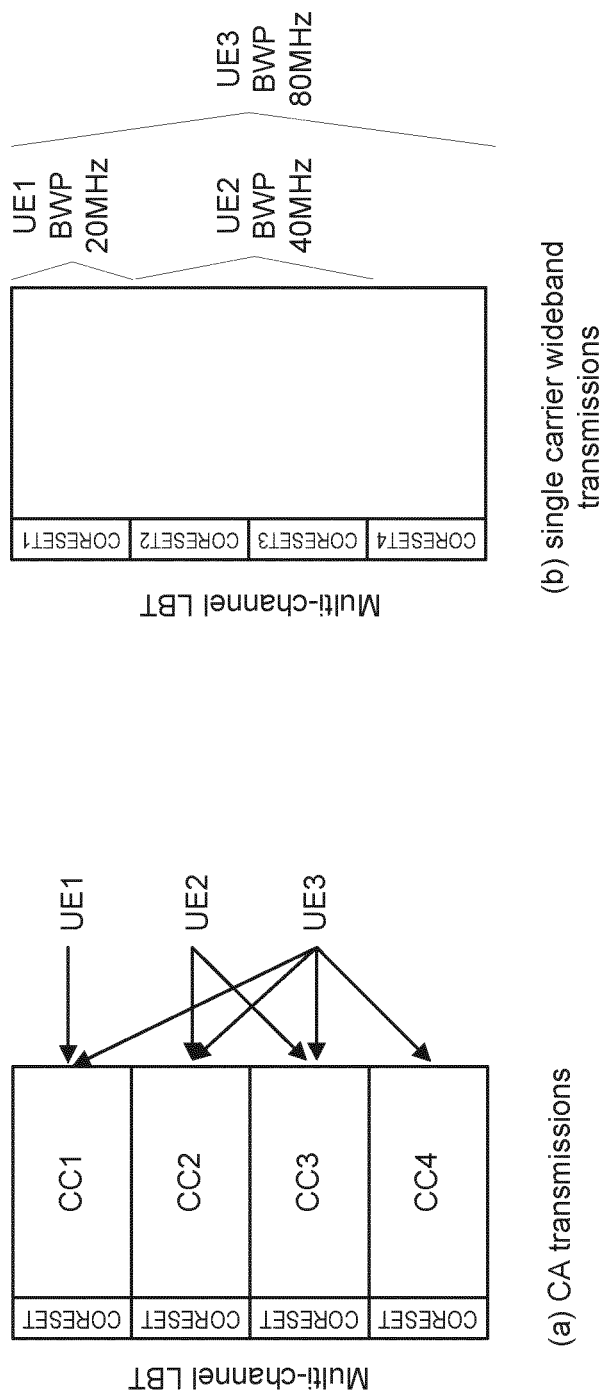
FIG. 1 illustrates an example of CA and single carrier wideband transmissions.

There has been considered a mechanism for configuring search space set groups with a switchable property, by indicating that a search space is "default" or "non-default" and by designing signaling to enable switching between possible multiple search space set groups. Also, in one of the embodiments, a method for a validity period of a switchable search space set group has been provided after which the wireless device may switch to monitor the default search space group. Furthermore, in another embodiment, the wireless device can be configured with a timer that sets a maximum time period which is started by the wireless device upon indication of monitoring of non-default search space set. The wireless device switches back to monitor the default search space set once the timer reaches or exceeds the maximum time period.

Currently, the wireless device behavior is to monitor any PDCCH search space set from the moment it is configured to the wireless device. However, behavior may be defined where the wireless device may switch between different search space group sets based on some signaling which is to be down selected among the alternatives. However, regardless of the specific signaling, it may be advantageous to design a (possibly fallback) mechanism in case the wireless device fails to detect the signaling which indicates a switch between search space groups.

Some embodiments of the present disclosure enable the wireless device to switch monitoring between different search spaces (e.g., default to non-default or non-default to default) groups based on a configured timer, in case, e.g., the wireless device fails to detect the signaling indication of such an event. Furthermore, the timer configuration may be set in relation to COT duration and/or (GC)PDCCH monitoring periodicity.

Some embodiments of the present disclosure may provide for a mechanism to preserve proper wireless device behavior in case the wireless device fails to detect the signaling of switching monitoring between different search space set group (SSSGs). In case of a failed detection, there may be a misunderstanding between the network node (e.g., gNB) and the wireless device on which search space groups are being monitored by the wireless device, which among other issues may result in missing the DCIs which are sent in SSSGs that are not monitored by the wireless device.

Before describing in detail exemplary embodiments, it is noted that the embodiments reside primarily in combinations of apparatus components and processing steps related to methods for switching control channel monitoring of search space set group. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The wireless device herein can be any type of wireless device capable of communicating with a network node or another wireless device over radio signals, such as wireless device (WD). The wireless device may also be a radio communication device, target device, device to device (D2D) wireless device, machine type wireless device or wireless device capable of machine to machine communication (M2M), low-cost and/or low-complexity wireless device, a sensor equipped with wireless device, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

In some embodiments, the term "timer" and "timer value" may be used interchangeably.

Even though the descriptions herein may be explained in the context of one of a Downlink (DL) and an Uplink (UL) communication, it should be understood that the basic principles disclosed may also be applicable to the other of the one of the DL and the UL communication. In some embodiments in this disclosure, the principles may be considered applicable to a transmitter and a receiver. For DL communication, the network node is the transmitter and the receiver is the wireless device. For the UL communication, the transmitter is the wireless device and the receiver is the network node.

Any two or more embodiments described in this disclosure may be combined in any way with each other.

The term "signaling" used herein may comprise any of: high-layer signaling (e.g., via Radio Resource Control (RRC) or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

Generally, it may be considered that the network, e.g. a signaling radio node and/or node arrangement (e.g., network node), configures a wireless device, in particular with the transmission resources. A resource may in general be configured with one or more messages. Different resources may be configured with different messages, and/or with messages on different layers or layer combinations. The size of a resource may be represented in symbols and/or subcarriers and/or resource elements and/or physical resource blocks (depending on domain), and/or in number of bits it may catty, e.g. information or payload bits, or total number of bits. The set of resources, and/or the resources of the sets, may pertain to the same carrier and/or bandwidth part, and/or may be located in the same slot, or in neighboring slots.

In some embodiments, control information on one or more resources may be considered to be transmitted in a message having a specific format. A message may comprise or represent bits representing payload information and coding bits, e.g., for error coding.

Receiving (or obtaining) control information may comprise receiving one or more control information messages (e.g., timer indication, DCI field). It may be considered that receiving control signaling comprises demodulating and/or decoding and/or detecting, e.g. blind detection of, one or more messages, in particular a message carried by the control signaling, e.g. based on an assumed set of resources, which may be searched and/or listened for the control information. It may be assumed that both sides of the communication are aware of the configurations, and may determine the set of resources, e.g. based on the reference size.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices corresponding to a table, and/or one or more bit patterns representing the information.

Configuring a Radio Node

Configuring a radio node, in particular a terminal or user equipment or the wireless device, may refer to the radio node being adapted or caused or set and/or instructed to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g., a configuration for transmitting and/or receiving on allocated resources, in particular frequency resources, or e.g., configuration for performing certain measurements on certain subframes or radio resources. A radio node may configure itself, e.g., based on configuration data received from a network or network node.

A network node may use, and/or be adapted to use, its circuitry/ies for configuring. Allocation information may be considered a form of configuration data. Configuration data may comprise and/or be represented by configuration information, and/or one or more corresponding indications and/or message/s.

Configuring in General

Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal (e.g., wireless device) may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor. In particular, configuring a terminal (e.g., wireless device) may comprise configuring the wireless device to perform certain measurements on certain subframes or radio resources and reporting such measurements according to embodiments of the present disclosure.

Predefined in the context of this disclosure may refer to the related information being defined for example in a standard, and/or being available without specific configuration from a network or network node, e.g., stored in memory, for example independent of being configured. Configured or configurable may be considered to pertain to the corresponding information being set/configured, e.g., by the network or a network node.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide methods and devices for switching control channel monitoring of search space set group.

Figure 3:
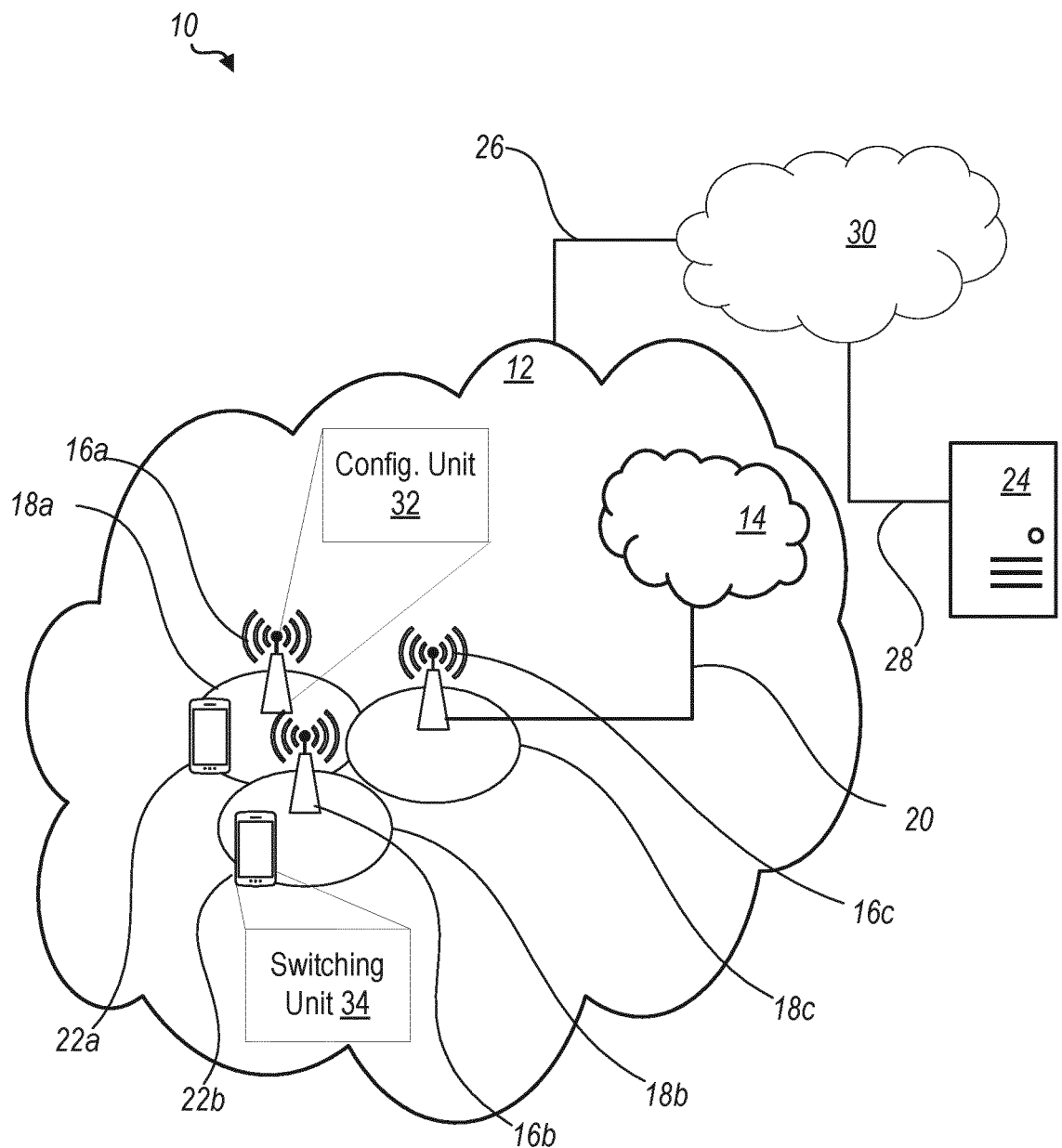
FIG. 3 is a schematic diagram of an example network architecture illustrating a communication system connected via an intermediate network to a host computer according to the principles in the present disclosure.

Referring again to the drawing figures, in which like elements are referred to by like reference numerals, there is shown in FIG. 3 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second wireless device 22b in coverage area 18b is wirelessly connectable to the corresponding network node 16b. While a plurality of wireless devices 22a, 22b (collectively referred to as wireless devices 22) are illustrated in this example, the disclosed embodiments are equally applicable to a situation where a sole wireless device is in the coverage area or where a sole wireless device is connecting to the corresponding network node 16. Note that although only two wireless devices 22 and three network nodes 16 are shown for convenience, the communication system may include many more wireless devices 22 and network nodes 16.

Also, it is contemplated that a wireless device 22 can be in simultaneous communication and/or configured to separately communicate with more than one network node 16 and more than one type of network node 16. For example, a wireless device 22 can have dual connectivity with a network node 16 that supports LTE and the same or a different network node 16 that supports NR. As an example, wireless device 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 3 as a whole enables connectivity between one of the connected wireless devices 22a, 22b and the host computer 24. The connectivity may be described as an over-the-top (OTT) connection. The host computer 24 and the connected wireless devices 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected wireless device 22a. Similarly, the network node 16 need not be aware of the future routing of an outgoing uplink communication originating from the wireless device 22a towards the host computer 24.

A network node 16 is configured to include a configuration unit 32 which is configured to configure the wireless device with at least two search space set groups (SSSGs); configure the wireless device with a timer for determining when to switch control channel monitoring between the at least two SSSGs; and optionally transmit signaling on the control channel in accordance with the configuration of the timer.

A wireless device 22 is configured to include a switching unit 34 which is configured to receive a configuration of at least two search space set groups (SSSGs); receive a configuration of a timer for determining when to switch control channel monitoring between the at least two SSSGs; monitor a first SSG of the at least two SSSGs; and one of switch to another of the at least two SSGs and continue monitoring the first SSG based at least in part on the timer.

Figure 2:
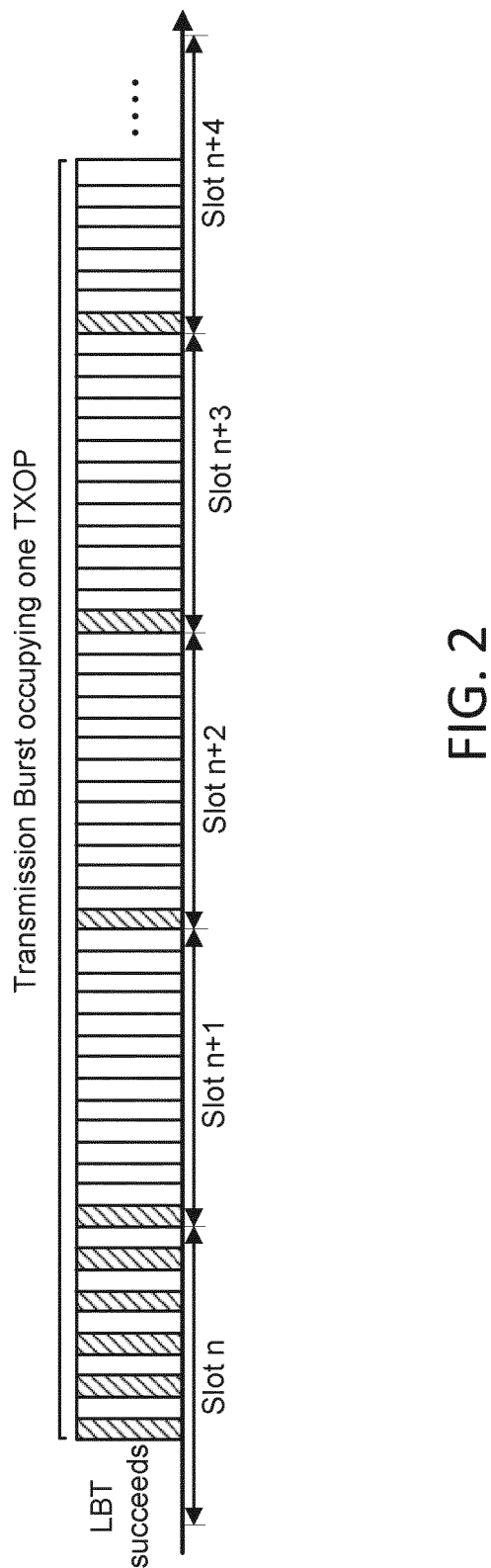
FIG. 2 illustrates an example of NR-U PDSCH and PDCCH transmissions and wireless device PDCCH monitoring.

Example implementations, in accordance with an embodiment, of the wireless device 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a wireless device 22 connecting via an OTT connection 52 terminating at the wireless device 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include a monitor unit 54 configured to enable the service provider to observe, monitor, control, transmit to and/or receive from the network node 16 and/or the wireless device 22.

The communication system 10 further includes a network node 16 provided in a communication system 10 and including hardware 58 enabling it to communicate with the host computer 24 and with the wireless device 22. The hardware 58 may include a communication interface 60 for setting up and maintaining a wired or wireless connection with an interface of a different communication device of the communication system 10, as well as a radio interface 62 for setting up and maintaining at least a wireless connection 64 with a wireless device 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include configuration unit 32 configured to perform network node methods discussed herein, such as the methods discussed with reference to FIG. 9 as well as other figures.

The communication system 10 further includes the wireless device 22 already referred to. The wireless device 22 may have hardware 80 that may include a radio interface 82 configured to set up and maintain a wireless connection 64 with a network node 16 serving a coverage area 18 in which the wireless device 22 is currently located. The radio interface 82 may be formed as or may include, for example, one or more RF transmitters, one or more RF receivers, and/or one or more RF transceivers.

The hardware 80 of the wireless device 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the wireless device 22 may further comprise software 90, which is stored in, for example, memory 88 at the wireless device 22, or stored in external memory (e.g., database, storage array, network storage device, etc.) accessible by the wireless device 22. The software 90 may be executable by the processing circuitry 84. The software 90 may include a client application 92. The client application 92 may be operable to provide a service to a human or non-human user via the wireless device 22, with the support of the host computer 24. In the host computer 24, an executing host application 50 may communicate with the executing client application 92 via the OTT connection 52 terminating at the wireless device 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by wireless device 22. The processor 86 corresponds to one or more processors 86 for performing wireless device 22 functions described herein. The wireless device 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to wireless device 22. For example, the processing circuitry 84 of the wireless device 22 may include a switching unit 34 configured to perform wireless device methods discussed herein, such as the methods discussed with reference to FIG. 10 as well as other figures.

Figure 4:
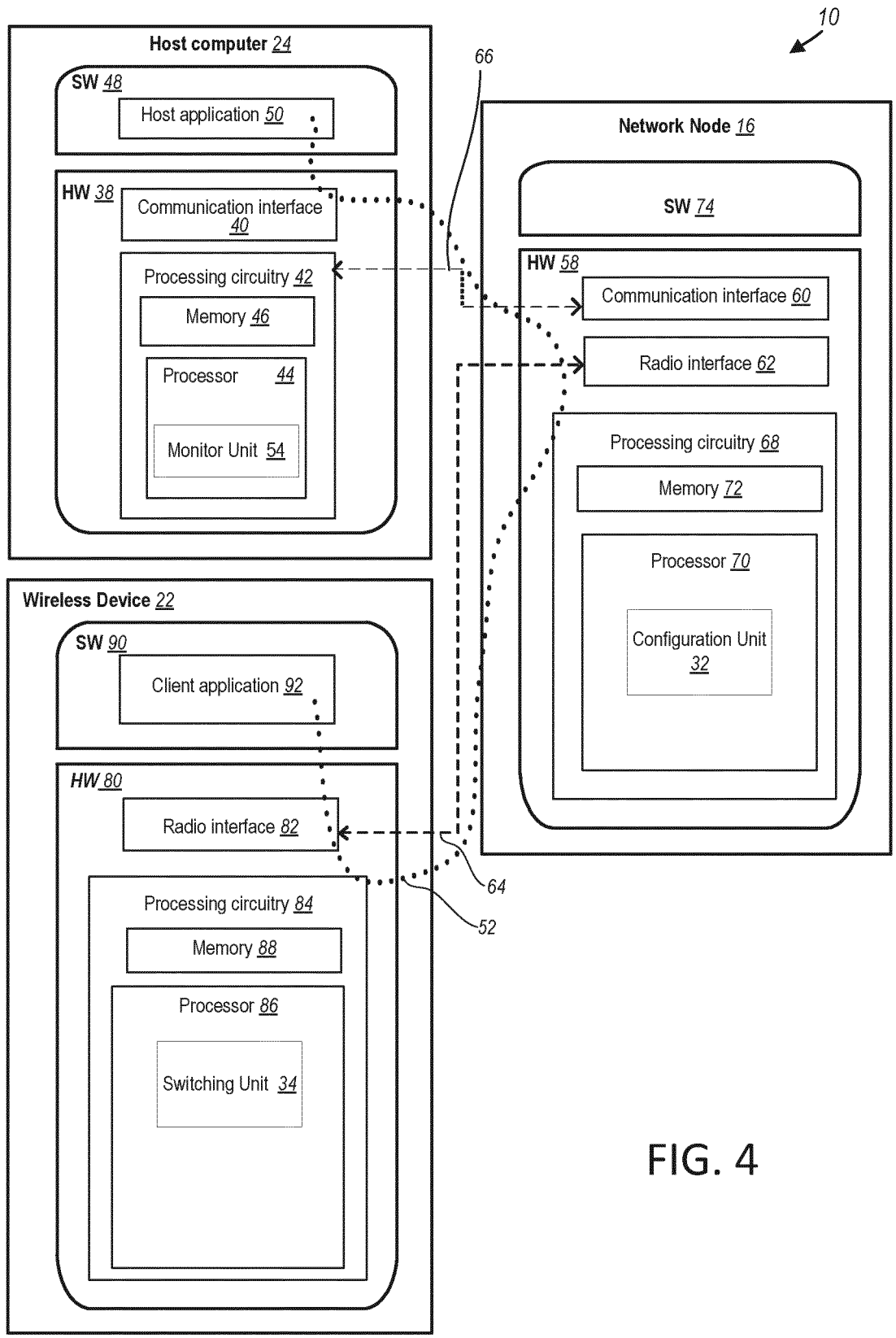
FIG. 4 is a block diagram of a host computer communicating via a network node with a wireless device over an at least partially wireless connection according to some embodiments of the present disclosure.

In some embodiments, the inner workings of the network node 16, wireless device 22, and host computer 24 may be as shown in FIG. 4 and independently, the surrounding network topology may be that of FIG. 3.

In FIG. 4, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the wireless device 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the wireless device 22 and the network node 16 is in accordance with the teachings of the embodiments described throughout this disclosure. One or more of the various embodiments improve the performance of OTT services provided to the wireless device 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and wireless device 22, in response to variations in the measurement results. The measurement procedure and/or the network functionality for reconfiguring the OTT connection 52 may be implemented in the software 48 of the host computer 24 or in the software 90 of the wireless device 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary wireless device signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors, etc.

Thus, in some embodiments, the host computer 24 includes processing circuitry 42 configured to provide user data and a communication interface 40 that is configured to forward the user data to a cellular network for transmission to the wireless device 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the wireless device 22, and/or preparing/terminating/maintaining/supporting/ending in receipt of a transmission from the wireless device 22.

In some embodiments, the host computer 24 includes processing circuitry 42 and a communication interface 40 that is configured to a communication interface 40 configured to receive user data originating from a transmission from a wireless device 22 to a network node 16. In some embodiments, the wireless device 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 3 and 4 show various "units" such as configuration unit 32, and switching unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 5:
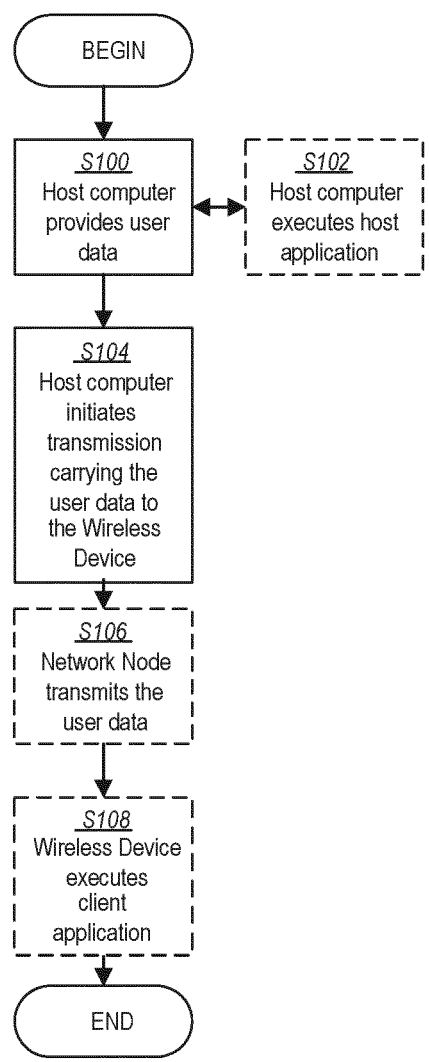
FIG. 5 is a flowchart illustrating example methods implemented in a communication system including a host computer, a network node and a wireless device for executing a client application at a wireless device according to some embodiments of the present disclosure.

FIG. 5 is a flowchart illustrating an exemplary method implemented in a communication system, such as, for example, the communication system of FIGS. 3 and 4, in accordance with one embodiment. The communication system may include a host computer 24, a network node 16 and a wireless device 22, which may be those described with reference to FIG. 4. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the wireless device 22 (Block S104). In an optional third step, the network node 16 transmits to the wireless device 22 the user data which was carried in the transmission that the host computer 24 initiated, in accordance with the teachings of the embodiments described throughout this disclosure (Block S106). In an optional fourth step, the wireless device 22 executes a client application, such as, for example, the client application 92, associated with the host application 50 executed by the host computer 24 (Block S108).

Figure 6:
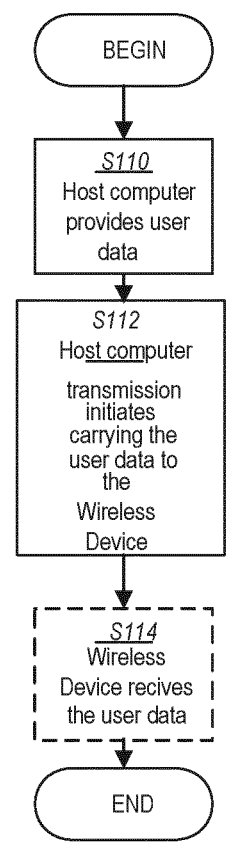
FIG. 6 is a flowchart illustrating example methods implemented in a communication system including a host computer, a network node and a wireless device for receiving user data at a wireless device according to some embodiments of the present disclosure.

FIG. 6 is a flowchart illustrating an exemplary method implemented in a communication system, such as, for example, the communication system of FIG. 3, in accordance with one embodiment. The communication system may include a host computer 24, a network node 16 and a wireless device 22, which may be those described with reference to FIGS. 3 and 4. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the wireless device 22 (Block S112). The transmission may pass via the network node 16, in accordance with the teachings of the embodiments described throughout this disclosure. In an optional third step, the wireless device 22 receives the user data carried in the transmission (Block S114).

Figure 7:
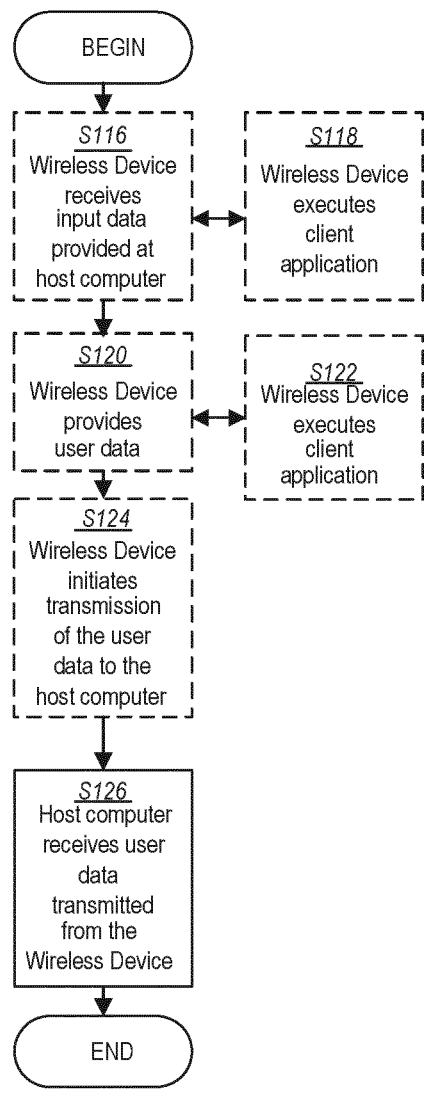
FIG. 7 is a flowchart illustrating example methods implemented in a communication system including a host computer, a network node and a wireless device for receiving user data from the wireless device at a host computer according to some embodiments of the present disclosure.

FIG. 7 is a flowchart illustrating an exemplary method implemented in a communication system, such as, for example, the communication system of FIG. 3, in accordance with one embodiment. The communication system may include a host computer 24, a network node 16 and a wireless device 22, which may be those described with reference to FIGS. 3 and 4. In an optional first step of the method, the wireless device 22 receives input data provided by the host computer 24 (Block S116). In an optional substep of the first step, the wireless device 22 executes the client application 92, which provides the user data in reaction to the received input data provided by the host computer 24 (Block S118). Additionally or alternatively, in an optional second step, the wireless device 22 provides user data (Block S120). In an optional substep of the second step, the wireless device provides the user data by executing a client application, such as, for example, client application 92 (Block S122). In providing the user data, the executed client application 92 may further consider user input received from the user. Regardless of the specific manner in which the user data was provided, the wireless device 22 may initiate, in an optional third substep, transmission of the user data to the host computer 24 (Block S124). In a fourth step of the method, the host computer 24 receives the user data transmitted from the wireless device 22, in accordance with the teachings of the embodiments described throughout this disclosure (Block S126).

Figure 8:
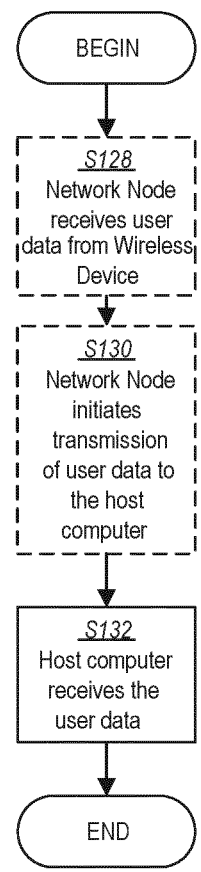
FIG. 8 is a flowchart illustrating example methods implemented in a communication system including a host computer, a network node and a wireless device for receiving user data at a host computer according to some embodiments of the present disclosure.

FIG. 8 is a flowchart illustrating an exemplary method implemented in a communication system, such as, for example, the communication system of FIG. 3, in accordance with one embodiment. The communication system may include a host computer 24, a network node 16 and a wireless device 22, which may be those described with reference to FIGS. 3 and 4. In an optional first step of the method, in accordance with the teachings of the embodiments described throughout this disclosure, the network node 16 receives user data from the wireless device 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 9:
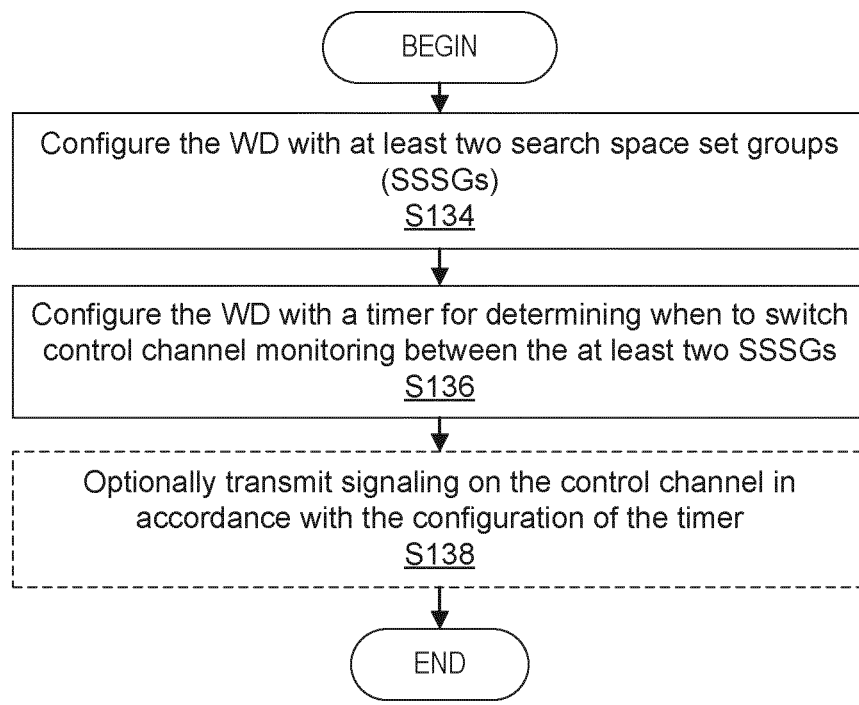
FIG. 9 is a flowchart of an example process in a network node for configuration unit according to some embodiments of the present disclosure.

FIG. 9 is a flowchart of an example process in a network node 16 according to some embodiments of the present disclosure. One or more Blocks and/or functions and/or methods performed by the network node 16 may be performed by one or more elements of network node 16 such as by configuration unit 32 in processing circuitry 68, processor 70, communication interface 60, radio interface 62, etc. according to the example method. The example method includes configuring (Block S134), such as via configuration unit 32, processing circuitry 68, processor 70, communication interface 60 and/or radio interface 62, the wireless device 22 with at least two search space set groups (SSSGs). The method includes configuring (Block S136), such as via configuration unit 32, processing circuitry 68, processor 70, communication interface 60 and/or radio interface 62, the wireless device 22 with a timer for determining when to switch control channel monitoring between the at least two SSSGs. The method includes optionally transmitting (Block S138), such as via configuration unit 32, processing circuitry 68, processor 70, communication interface 60 and/or radio interface 62, signaling on the control channel in accordance with the configuration of the timer.

In some embodiments, the configuration of the timer is based at least in part on at least one of a channel occupancy time (COT) duration and a group common physical downlink control channel (GC-PDCCH) monitoring periodicity. In some embodiments, the method further includes signaling, such as via configuration unit 32, processing circuitry 68, processor 70, communication interface 60 and/or radio interface 62, an indication to switch PDCCH monitoring between the at least two SSSGs. In some embodiments, the method includes signaling, such as via configuration unit 32, processing circuitry 68, processor 70, communication interface 60 and/or radio interface 62, an indication to set or reset the timer to another value. In some embodiments, the signalling is via a PDCCH or radio resource control (RRC) signaling.

Figure 10:
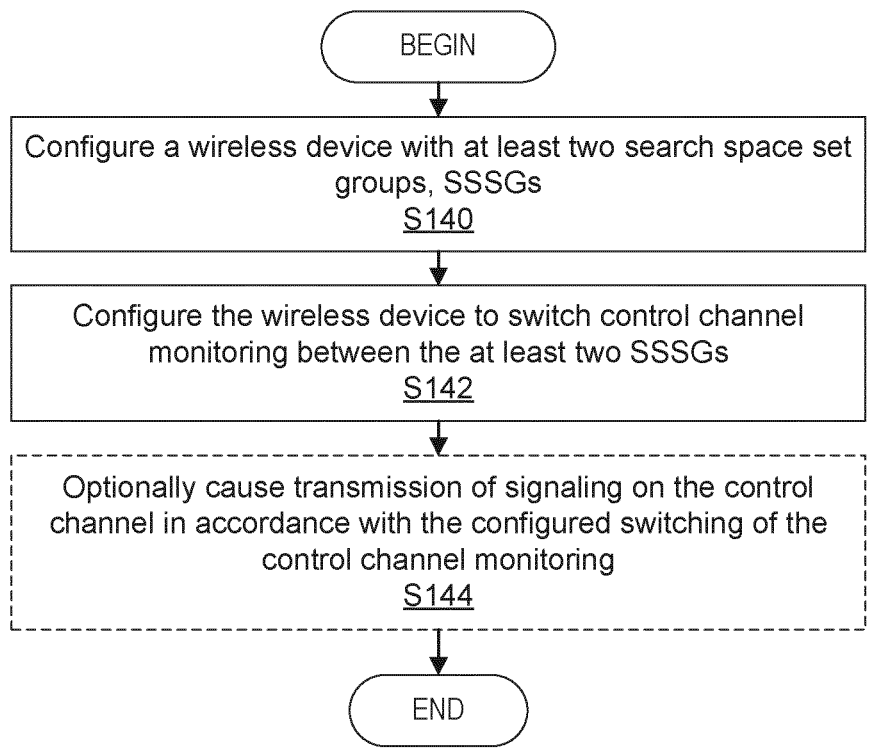
FIG. 10 is a flowchart of another example process in a network node according to some embodiments of the present disclosure.

FIG. 10 is a flowchart of another example process in a network node 16 according to some embodiments of the present disclosure. One or more Blocks and/or functions and/or methods performed by the network node 16 may be performed by one or more elements of network node 16 such as by configuration unit 32 in processing circuitry 68, processor 70, communication interface 60, radio interface 62, etc. according to the example method. The example method includes configuring (Block S140), such as via configuration unit 32, processing circuitry 68, processor 70, communication interface 60 and/or radio interface 62, the wireless device 22 with at least two search space set groups, SSSGs, as described herein. The method includes configuring (Block S142), such as via configuration unit 32, processing circuitry 68, processor 70, communication interface 60 and/or radio interface 62, the wireless device 22 to switch control channel monitoring between the at least two SSSGs, as described herein. The method includes optionally causing (Block S144), such as via configuration unit 32, processing circuitry 68, processor 70, communication interface 60 and/or radio interface 62, transmission of signaling on the control channel in accordance with the configured switching of the control channel monitoring, as described herein.

According to one or more embodiments, the configuring of the wireless device 22 to switch control channel monitoring between the at least two SSSGs corresponds to configuring the wireless device 22 with a timer for determining when to switch control channel monitoring between the at least two SSSGs where the switching is configured to occur based at least on an expiration of the timer. According to one or more embodiments, the configuring of the wireless device 22 to switch control channel monitoring between the at least two SSSGs further comprises an indication that triggers the start of the timer and is an instruction to monitor one of the at least two SSSGs. According to one or more embodiments, a value of the timer is based at least on one of a duration of a channel occupancy time, COT, a duration of a slot format and a periodicity of group common physical downlink control channel, GC-PDCCH.

According to one or more embodiments, the configuring of the wireless device 22 to switch control channel monitoring between the at least two SSSGs corresponds to an indication for switching control channel monitoring. According to one or more embodiments, the indication for switching control channel monitoring is based at least on signaling downlink control information, DCI, format 2_0. According to one or more embodiments, the indication for switching control channel monitoring is based at least on a value of a bit field in the DCI format 2_0.

According to one or more embodiments, the bit field in the DCI format 2_0 indicates to monitor a first SSSG of the at least two SSSGs based at least on the value of the bit field being equal to 0. According to one or more embodiments, the bit field in the DCI format 2_0 indicates to monitor a second SSSG of the at least two SSSGs based at least on the value of the bit field being equal to 1. According to one or more embodiments, the configuring of the wireless device 22 with at least two SSSGs includes: determining a timing for the wireless device 22 to switch control channel monitoring between the at least two SSSGs; and signaling the indication to the wireless device 22, the indication being based on the determined timing for the wireless device 22.

Figure 11:
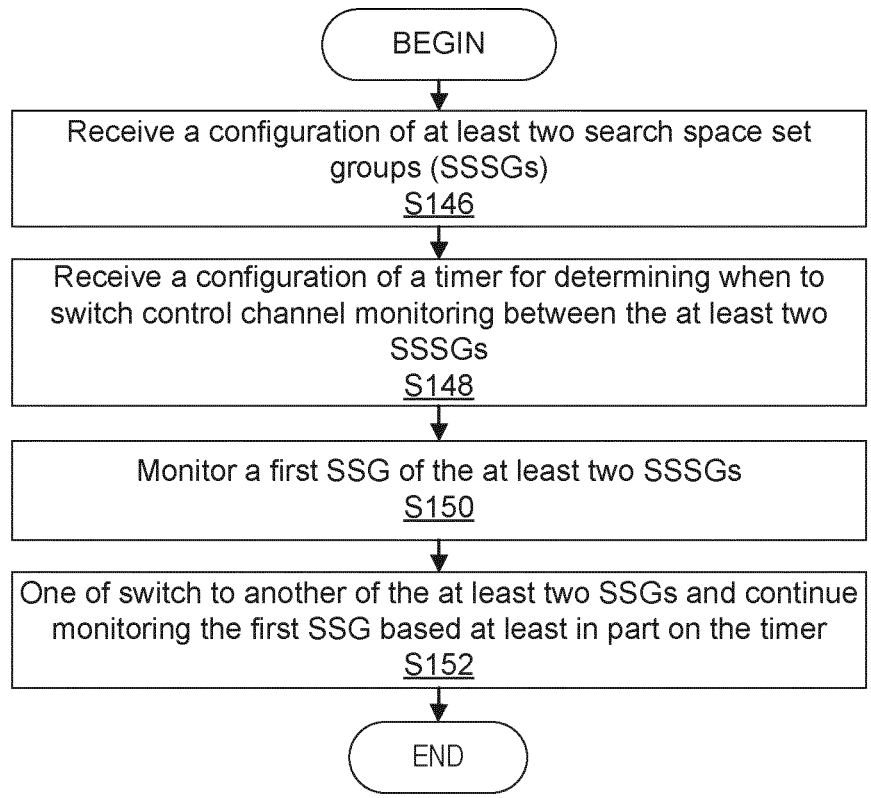
FIG. 11 is a flowchart of an example process in a wireless device for switching unit according to some embodiments of the present disclosure.

FIG. 11 is a flowchart of an example process in a wireless device 22 according to some embodiments of the present disclosure. One or more Blocks and/or functions and/or methods performed by wireless device 22 may be performed by one or more elements of wireless device 22 such as by switching unit 34 in processing circuitry 84, processor 86, radio interface 82, etc. The example method includes receiving (Block S146), such as via switching unit 34, processing circuitry 84, processor 86 and/or radio interface 82, a configuration of at least two search space set groups (SSSGs). The method includes receiving (Block S148), such as via switching unit 34, processing circuitry 84, processor 86 and/or radio interface 82, a configuration of a timer for determining when to switch control channel monitoring between the at least two SSSGs. The method includes monitoring (Block S150), such as via switching unit 34, processing circuitry 84, processor 86 and/or radio interface 82, a first SSG of the at least two SSSGs. The method includes one of switching (Block S152), such as via switching unit 34, processing circuitry 84, processor 86 and/or radio interface 82, to another of the at least two SSGs and continuing monitoring the first SSG based at least in part on the timer.

In some embodiments, the configuration of the timer is based at least in part on at least one of a channel occupancy time (COT) duration and a group common physical downlink control channel (GC-PDCCH) monitoring periodicity. In some embodiments, the method further comprises one of switching to another of the at least two SSGs and continuing monitoring the first SSG based further on whether or not the wireless device 22 detects an indication to switch PDCCH monitoring between the at least two SSSGs while the timer is running. In some embodiments, the method further includes receiving, such as via switching unit 34, processing circuitry 84, processor 86 and/or radio interface 82, an indication to set or reset the timer to another value and based on the indication set or reset the timer to the another value. In some embodiments, the configuration is received, such as via switching unit 34, processing circuitry 84, processor 86 and/or radio interface 82, via radio resource control (RRC) signaling.

Figure 12:
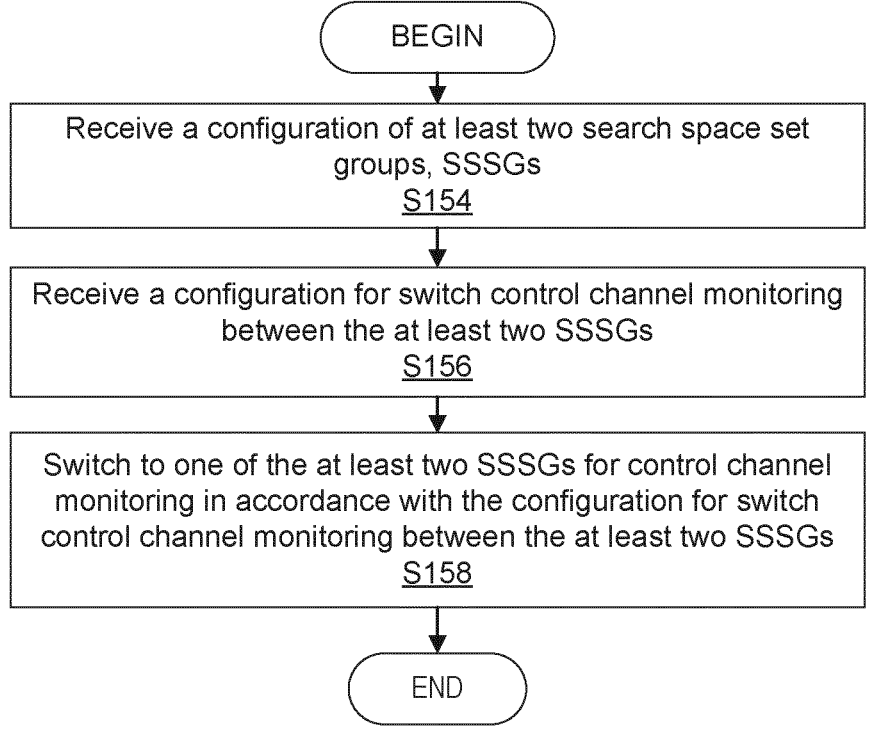
FIG. 12 is a flowchart of another example process in a wireless device according to some embodiments of the present disclosure.

FIG. 12 is a flowchart of another example process in a wireless device 22 according to some embodiments of the present disclosure. One or more Blocks and/or functions and/or methods performed by wireless device 22 may be performed by one or more elements of wireless device 22 such as by switching unit 34 in processing circuitry 84, processor 86, radio interface 82, etc. The example method includes receiving (Block S154), such as via switching unit 34, processing circuitry 84, processor 86 and/or radio interface 82, a configuration of at least two search space set groups, SSSGs, as described herein. The method includes receiving (Block S156), such as via switching unit 34, processing circuitry 84, processor 86 and/or radio interface 82, a configuration for switching control channel monitoring between the at least two SSSGs, as described herein. The method includes switching (Block S158), such as via switching unit 34, processing circuitry 84, processor 86 and/or radio interface 82, to one of the at least two SSSGs for control channel monitoring in accordance with the configuration for switching control channel monitoring between the at least two SSSGs According to one or more embodiments, the configuration for switching control channel monitoring between the at least two SSSGs corresponds to a configuration for a timer for determining when to switch control channel monitoring between the at least two SSSGs where the switching is configured to occur based at least on an expiration of the timer. According to one or more embodiments, the configuration for switching control channel monitoring between the at least two SSSGs comprises an indication that triggers the start of the timer is an instruction to monitor one of the at least two SSSGs. According to one or more embodiments, a value of the timer is based at least on one of a duration of a channel occupancy time, COT, a duration of a slot format and a periodicity of group common physical downlink control channel, GC-PDCCH.

According to one or more embodiments, the configuration for switching control channel monitoring between the at least two SSSGs corresponds to an indication to switch control channel monitoring. According to one or more embodiments, the indication to switch control channel monitoring is based at least on detection of downlink control information, DCI, format 2_0. According to one or more embodiments, the indication to switch control channel monitoring is based at least on a value of a bit field in the DCI format 2_0. According to one or more embodiments, the bit field in the DCI format 2_0 indicates for the wireless device to monitor a first SSSG of the at least two SSSGs based at least on the value of the bit field being equal to 0. According to one or more embodiments, the bit field in the DCI format 2_0 indicates for the wireless device to monitor a second SSSG of the at least two SSSGs based at least on the value of the bit field being equal to 1.

Having described the general process flow of arrangements of the disclosure and having provided examples of hardware and software arrangements for implementing the processes and functions of the disclosure, the sections below provide details and examples of arrangements for switching control channel monitoring of search space set group, which may be implemented by the network node 16, wireless device 22 and/or host computer 24.

Embodiment Set #1 (Switching Between Default and Non-Default Search Space Groups with a Timer)

According to the first embodiment, a wireless device 22 is configured by the network node 16 with at least two groups of search space set groups (SSSGs) with one of the groups designated as the default search space set group. The wireless device 22 monitors the search space sets in the default search space set group unless it is instructed by the network node 16 to switch to a nondefault search space set group, based on an explicit or implicit signaling.

When the wireless device 22 is instructed to monitor a non-default search space set group, the wireless device 22 may start a timer for monitoring said non-default search space set group. Upon expiry of the timer, the wireless device 22 such as by switching unit 34 in processing circuitry 84, processor 86, radio interface 82, etc. switches back to monitor the default search space set group. The network node 16 such as by configuration unit 32 in processing circuitry 68, processor 70, communication interface 60, radio interface 62, etc. may instruct the wireless device 22 to set or reset the timer to a new value before expiry based on an explicit or implicit signaling.

In one embodiment, the wireless device 22 sets the timer to a value configured by the network node 16 via higher layer signaling. One nonlimiting example of such signaling is the RRC layer signaling. In another embodiment, the wireless device 22 such as by switching unit 34 in processing circuitry 84, processor 86, radio interface 82, etc. sets the timer to a remaining channel occupancy time signaled by the network node 16. One nonlimiting example of such signaling is via a GC-PDCCH (i.e., a PDCCH carrying DCI format 2_0). In yet another embodiment, the wireless device 22 sets the timer corresponding to the duration of the slot formats signaled by the network node 16 via a GC-PDCCH.

In a further embodiment, the wireless device 22 such as by switching unit 34 in processing circuitry 84, processor 86, radio interface 82, etc. sets the timer based on other fields signaled by the network node 16 via a GC-PDCCH. In one further embodiment, the wireless device 22 implicitly derives the timer value and sets the timer to the periodicity of the GC-PDCCH when the wireless device 22 such as by switching unit 34 in processing circuitry 84, processor 86, radio interface 82, etc. receives a GC-PDCCH. In a non-limiting exemplary example of the above embodiment the signaling to switch to a non-default SSSG is either explicit by a bit flag in GC-PDCCH/PDCCH and/or implicit by detecting of the GC-PDCCH/PDCCH and/or implicit based on the information provided in another field conveyed in the GC-PDCCH/PDCCH such as the COT duration.

As a nonlimiting exemplary example of embodiment #1, the maximum timer period equals to network node (e.g., gNB) 16 COT duration (indicated in GC-PDCCH) or equals to network node (e.g., gNB) 16 COT duration (indicated in GC-PDCCH)+some offset (possibly in terms of number of slots).

As another nonlimiting exemplary example of embodiment #1, the maximum timer period is equal to the network node (e.g., gNB) 16 periodicity of GC-PDCCH/PDCCH (carrying the switching indication, explicitly or implicitly) or, is equal to network node (e.g., gNB) 16 periodicity of GC-PDCCH/PDCCH (carrying the switching indication, explicitly or implicitly)+some offset (possibly in terms of number of slots).

Embodiment #1.1

In a variation of embodiment #1, whether the wireless device 22 such as by switching unit 34 in processing circuitry 84, processor 86, radio interface 82, etc. switches back to default monitoring search space or continues monitoring the non-default (or search space group that is being monitored at that moment) is configured to the wireless device 22 by RRC signaling.

Embodiment #1.2

In a variation of embodiment #1, #1.1, there are different SSSGs (possibly more than 2) with different labels (default, non-default in case of two SSSGs) where a different timer is configured for each SSSG each of which starts after the wireless device 22 is instructed to monitor that specific SSSG. The behavior of the wireless device 22 may be defined according to one of the methods in embodiment #1, #1.1, #1.2.

Embodiment Set #2 (Further Embodiments for Switching Based on DCI Format 2_0)

In this set of embodiments, the instruction by the network node 16 such as by configuration unit 32 in processing circuitry 68, processor 70, communication interface 60, radio interface 62, etc. to switch between the default and non-default search space set groups in the embodiments above is provided implicitly or explicitly via a GC-PDCCH, i.e., a DCI format 2_0 message carrying a PDCCH. It may be assumed that the wireless device 22 is configured to monitor for DCI 2_0 with periodicity T (slots), i.e., once every T slots. It should be noted that multiple monitoring occasions can occur within a channel occupancy.

In some embodiments, a procedure may be defined as follows for implicit switching to the non-default search space where switching indication is based on detection of DCI 2_0 only:

If the wireless device 22 detects DCI 2_0 in any configured monitoring occasion:
  The wireless device 22 switches to the non-default SSG;
  The wireless device 22 starts (or restarts) a timer, $T_{SSG}$;
If the wireless device 22 does not detect DCI 2_0 in a monitoring occasion:
  The wireless device 22 such as by switching unit 34 in processing circuitry 84, processor 86, radio interface 82, etc. monitors whichever SSG it was monitoring previously, and if the timer had already started, the timer keeps running.

In some embodiments, a procedure may be defined as follows for explicit switching to the non-default search space where switching indication is based on detection of DCI 2_0 and the value of a 1-bit flag (SSG switch bit) in DCI 2_0:

If the wireless device 22 such as by switching unit 34 in processing circuitry 84, processor 86, radio interface 82, etc. detects DCI 2_0 with SSG switch bit=1 in any configured monitoring occasion:
  The wireless device 22 such as by switching unit 34 in processing circuitry 84, processor 86, radio interface 82, etc. switches to the non-default SSG;
  wireless device 22 such as by switching unit 34 in processing circuitry 84, processor 86, radio interface 82, etc. starts (or restarts) a timer, $T_{SSG}$;
If the wireless device 22 such as by switching unit 34 in processing circuitry 84, processor 86, radio interface 82, etc. detects a DCI 2_0 with SSG switch bit=0 or the wireless device 22 does not detect DCI 2_0 in a monitoring occasion:
  The wireless device 22 such as by switching unit 34 in processing circuitry 84, processor 86, radio interface 82, etc. monitors whichever SSG it was monitoring previously, and if the timer had already started, the timer keeps running.

In another embodiment, the procedure is defined as follows for explicit switching to the non-default search space where the switching indication is based on detection of DCI 2_0 and the value of a 1-bit flag (SSG switch bit) in DCI 2_0:

If the wireless device 22 such as by switching unit 34 in processing circuitry 84, processor 86, radio interface 82, etc. detects DCI 2_0 with SSG switch bit=1 in any configured monitoring occasion:
  The wireless device 22 such as by switching unit 34 in processing circuitry 84, processor 86, radio interface 82, etc. switches to the other SSG, i.e., the SSG it is currently not monitoring;
  If the wireless device 22 such as by switching unit 34 in processing circuitry 84, processor 86, radio interface 82, etc. switches to the non-default SSG, the wireless device 22 starts (or restarts) a timer, $T_{SSG}$;
If the wireless device 22 such as by switching unit 34 in processing circuitry 84, processor 86, radio interface 82, etc. detects a DCI 2_0 with SSG switch bit=0 or the wireless device 22 does not detect DCI 2_0 in a monitoring occasion:
  The wireless device 22 such as by switching unit 34 in processing circuitry 84, processor 86, radio interface 82, etc. monitors whichever SSG it was monitoring previously, and if the timer had already started, it keeps running.

In another embodiment, the procedure is defined as follows for explicit switching to the non-default search space where switching indication is based on detection of DCI 2_0 and the value of a 1-bit flag (SSG switch bit) in DCI 2_0:

If the wireless device 22 such as by switching unit 34 in processing circuitry 84, processor 86, radio interface 82, etc. detects DCI 2_0 with SSG switch bit=1 in any configured monitoring occasion:
  The wireless device 22 such as by switching unit 34 in processing circuitry 84, processor 86, radio interface 82, etc. starts or continues monitoring the non-default SSG;
  If the wireless device 22 such as by switching unit 34 in processing circuitry 84, processor 86, radio interface 82, etc. switches to the non-default SSG; the wireless device 22 starts (or restarts if the timer was already running) a timer, $T_{SSG}$;
If the wireless device 22 such as by switching unit 34 in processing circuitry 84, processor 86, radio interface 82, etc. detects a DCI 2_0 with SSG switch bit=0 in any configured monitoring occasion:
  The wireless device 22 such as by switching unit 34 in processing circuitry 84, processor 86, radio interface 82, etc. starts or continues monitoring the default SSG;
  The timer is turned off or equivalently set to 0 or the expired state;
If the wireless device 22 does not detect DCI 2_0 in a monitoring occasion:
  The wireless device 22 such as by switching unit 34 in processing circuitry 84, processor 86, radio interface 82, etc. monitors whichever SSG it was monitoring previously, and if the timer had already started, it keeps running.

In each of the above embodiments, upon timer expiry, the wireless device 22 such as by switching unit 34 in processing circuitry 84, processor 86, radio interface 82, etc. switches back to monitoring the default SSG. That is, the network node (e.g., gNB) 16 may know with 100% certainty that the wireless device 22 will be monitoring the default SSG no later than TSSG seconds after the last DCI 2_0 that the network node 16 transmitted. This may be useful for any of the above embodiments to provide robustness to potential DCI 2_0 detection failures.

Embodiment Set #13 (Further Embodiments for Timer Configuration)

In one embodiment, the timer value, TSSG, is configured by RRC. The configuration may further depend on whether the COT duration field in DCI format 2_0 is configured or not as follows.

If the COT duration field in DCI 2_0 is configured:
The wireless device 22 may be configured via RRC to dynamically set $T_{SSG}=X+1$ where X is the COT duration indicated in the DCI 2_0 message;
X can be in the range $\{1, X_{max}\}$ where $X_{max}$ can be greater than T, the configured monitoring periodicity of the GC-PDCCH;

If the COT duration field in DCI 2_0 is not configured:
The semi-statically configured value of $T_{SSG}$ depends on how often the network node (e.g., gNB) 16 expects to transmit GC-PDCCH;
If the network node (e.g., gNB) 16 such as by configuration unit 32 in processing circuitry 68, processor 70, communication interface 60, radio interface 62, etc. transmits DCI 2_0 in every monitoring occasion, then $T_{SSG}$ is set to T+1 slots;
Otherwise, a larger value of $T_{SSG}$ is configured.

Embodiment Set #4 (Control of UL LBT within a Channel Occupancy)

In this embodiment, the control of the type of UL LBT that is performed by wireless devices 22 such as by switching unit 34 in processing circuitry 84, processor 86, radio interface 82, etc. transmitting within the channel occupancy is addressed for two cases. The first is when a COT duration field is configured to be transmitted in DCI format 2_0. The second is when a COT duration field is not configured to be transmitted.

If the COT Duration Field in DCI 2_0 is Configured:
The type of category 2 (CAT2) LBT to be performed can be configured to the wireless device 22 via RRC signaling. If it is not configured a specific type of CAT2 LBT, e.g., one with duration of 25 us may be assumed.
If the wireless device 22 such as by switching unit 34 in processing circuitry 84, processor 86, radio interface 82, etc. detects DCI 2_0 in any configured monitoring occasion:
The wireless device 22 such as by switching unit 34 in processing circuitry 84, processor 86, radio interface 82, etc. can convert any UL grants (scheduled or configured uplink) allocated with category 4 (CAT4) LBT to CAT2 LBT for the next X slots, where X is the indicated COT duration;
Unless the wireless device 22 such as by switching unit 34 in processing circuitry 84, processor 86, radio interface 82, etc. detects another DCI 2_0 within the X slot duration, the wireless device 22 may use CAT4 LBT for slots exceeding the X slot duration until such time as the wireless device 22 detects another DCI 2_0 indicating a (potentially different) value of X.

In a variation of this embodiment, the specific CAT 2 LBT type may be indicated to the wireless device 22 in the DCI 2_0 message. The wireless device 22 such as by switching unit 34 in processing circuitry 84, processor 86, radio interface 82, etc. then uses this indicated LBT type for all UL transmissions that occur within the indicated COT duration.
If the COT Duration Field in DCI 2_0 is NOT Configured:
In one embodiment, if the wireless device 22 such as by switching unit 34 in processing circuitry 84, processor 86, radio interface 82, etc. detects DCI 2_0 in any configured monitoring occasion, the wireless device 22 such as by switching unit 34 in processing circuitry 84, processor 86, radio interface 82, etc. can convert CAT4 LBT to CAT2 LBT for scheduled or configured UL transmissions for the duration of the indicated SFI.

In another embodiment, an explicit 1-bit CAT4-to-CAT2 conversion field in DCI 2_0 is configured (by the network node 16) to the wireless device 22. When this field is set to 1 the wireless device 22 can convert CAT4 LBT to CAT2 LBT for scheduled or configured UL transmissions for the duration of the indicated SFI.

In another embodiment, CAT2 LBT can be used for UL scheduled or configured grants originally allocated with CAT4 LBT if a 1-bit CAT4-to-CAT2 conversion field in RRC is set to 1, where the field is appended to each row of the RRC configured slot format combination table.

In another embodiment, CAT2 LBT can be used for UL scheduled or configured grants originally allocated with CAT4 LBT if an LBT type indicator which is appended to each column of the slot format combination table allows this. That is, the LBT followed is the one indicated in the LBT type indicator.

In the above embodiments, unless the wireless device 22 such as by switching unit 34 in processing circuitry 84, processor 86, radio interface 82, etc. detects another DCI 2_0 within the duration of previously indicated SFI, the wireless device 22 such as by switching unit 34 in processing circuitry 84, processor 86, radio interface 82, etc. may use CAT4 LBT for slots exceeding the previous SFI duration until such time as the wireless device 22 detects another DCI 2_0 indicating SFI.

Embodiment Set #15 (Switching Between Search Space Set Groups without a Timer)

In this embodiment, a switching procedure based on explicit switching is based on detection of DCI 2_0 and the value of a 1-bit flag (SSG switch bit) in DCI 2_0 is defined as follows:
If the wireless device 22 such as by switching unit 34 in processing circuitry 84, processor 86, radio interface 82, etc. detects DCI 2_0 with SSG switch bit=1 in any configured monitoring occasion:
The wireless device 22 such as by switching unit 34 in processing circuitry 84, processor 86, radio interface 82, etc. starts or continues monitoring the non-default SSG;
If the wireless device 22 such as by switching unit 34 in processing circuitry 84, processor 86, radio interface 82, etc. detects a DCI 2_0 with SSG switch bit=0 in any configured monitoring occasion:
The wireless device 22 such as by switching unit 34 in processing circuitry 84, processor 86, radio interface 82, etc. starts or continues monitoring the default SSG;
If the wireless device 22 does not detect DCI 2_0 in a monitoring occasion:
The wireless device 22 such as by switching unit 34 in processing circuitry 84, processor 86, radio interface 82, etc. monitors whichever SSG it was monitoring previously.

In this embodiment, a timer is not configured or is not necessary since the two search space set groups are configured with search space sets that are common to both groups. The wireless device 22 can be reached via PDCCHs addressed to wireless device 22 in these search space sets that are common to both groups even when there is a mismatch between the SSSG assumption between the network node (e.g., gNB) 16 and the wireless device 22. The search space sets that are common to both groups can be both common and wireless device-specific search space sets.

Embodiment Set #16 (COT Duration Field in DCI)

In this embodiment, the DCI Format 2_0 in 3GPP NR Rel-15 may be extended with COT duration field. Each value of the bit field corresponds to a COT duration value. The width of the bit field may depend on the possible number different COT duration values that can be indicated to the wireless device 22. This bit-field can be configured by the higher layer (by the network node 16), or as a predefined values and/or a table in a specification (which may be known to network node 16 and wireless device 22).

As one nonlimiting example of this embodiment, a field of N bits can be configured, where each indicated value of COT duration is equal to a decimal value equivalent of the bit pattern e.g., for N=3, 101 indicates a duration of 5 slots.

Embodiment Set #7 (Search Space Set Group Switching Field in DCI)

In this embodiment, the DCI Format 2_0 in 3GPP NR Rel-15 may be extended with search space set group switching bit flag as a field. The interpretation of the bit flag is according to procedure described in embodiment 2. This bit-field can be configured by the higher layer (by the network node 16), or as a predefined values and/or a table in a specification (which may be known to network node 16 and wireless device 22).

As one nonlimiting example of this embodiment the place of the bit flag in DCI 2_0 may be specified as a predefined position in relation to other fields in DCI e.g., if the field is defined per serving cell it can be at the beginning or at the end of DCI possibly placed in the order of serving cell indices; or, for example, at the beginning or end of the SFI-index field of the corresponding serving cell that the switching is applied to.

As one nonlimiting example of this embodiment, the flag is specified by an RRC parameter SearchSpaceSwitchingFlag and the place/position of the flag is specified by sub parameter positionInDCI under e.g.,

```
SearchSpaceSwitchingFlag ::= SEQUENCE {
   BitFlag                    Bit
OPTIONAL, -- Need M
   servingCellId    ServCellIndex,
                                          OPTIONAL, --
Need M
   positionInDCI    INTEGER(0..max_DCI2_0_PayloadSize-1)
}
```

Embodiment Set #8 (LBT Category Indication Field in DCI)

In this embodiment, the DCI Format 2_0 in 3GPP NR Rel-15 may be extended with an LBT category indication field. Each value of the bit field corresponds an LBT category that the wireless devices 22 can perform. The width of the bit field may depend on the possible number of different LBT categories that wireless devices 22 can performs. This bit-field can be configured by the higher layer or as a predefined values and/or table in specification.

In a non-limiting example, the duration that the wireless device 22 can perform the specified LBT category is the extent of the COT duration or the duration of the SFI field (described in the previous embodiments). In a non-limiting example, a bit field size is one and it indicates whether the wireless device 22 can switch to one of the CAT1, 16 us CAT2 or 25 us CAT LBTs, and which one of these values is used can be predefined in the specification or RRC configured. In a non-limiting example, a bit field size is two and each of the bit pattern values of the bit field indicates to the wireless device 22 to switch to CAT1 LBT, 16 us CAT2 LBT or 25 us CAT LBT or CAT4 LBT. In a non-limiting example, a bit field size is two and each of the bit pattern values of the bit field indicates to the wireless device 22 to switch to CAT1 LBT, 16 us CAT2 LBT, 25 us CAT LBTs or performs previously indicated LBT category.

In a non-limiting example, the wireless devices 22 such as by switching unit 34 in processing circuitry 84, processor 86, radio interface 82, etc. switch from the previously indicated LBT category to the one indicated in this field. In a non-limiting example, the wireless devices 22 such as by switching unit 34 in processing circuitry 84, processor 86, radio interface 82, etc. perform the category indicated in this field for the configured UL/DL transmission already configured for the wireless devices 22. As one nonlimiting example of this embodiment, the field is specified by LBTcategoryIndication field and is place in DCI as specified in an RRC subparameter positionInDCI, e.g.:

```
LBTcategoryIndication := SEQUENCE {
   BitField                              SEQUENCE
(SIZE (1..LBTcatFieldSize)) OF BIT
   servingCellId        ServCellIndex,
   LBTbandwidth                          index of the LBT bandwidth as
defined specifications.
   LBTcatFieldSize                       INTEGER
                                                OPTIONAL, -
- Need M
   positionInDCI        INTEGER(0..max_DCI2_0_PayloadSize-1).
```

Some Examples

Example A1. A network node 16 configured to communicate with a wireless device 22, the network node 16 configured to, and/or comprising a radio interface 62 and/or comprising processing circuitry 68 configured to:
   configure the wireless device 22 with at least two search space set groups (SSSGs);
   configure the wireless device 22 with a timer for determining when to switch control channel monitoring between the at least two SSSGs; and
   optionally transmit signaling on the control channel in accordance with the configuration of the timer.

Example A2. The network node 16 of Example A1, wherein the configuration of the timer is based at least in part on at least one of a channel occupancy time (COT) duration and a group common physical downlink control channel (GC-PDCCH) monitoring periodicity Example A3. The network node 16 of any one of Examples A1 and A2, wherein the network node 16 and/or the radio interface 62 and/or the processing circuitry 68 is further configured to:
   signal an indication to switch PDCCH monitoring between the at least two SSSGs;
   signal an indication to set or reset the timer to another value.

Example A4. The network node 16 of any one of Examples A1-A4, wherein the signalling is via a PDCCH or radio resource control (RRC) signaling.

Example B1. A method implemented in a network node 16, the method comprising:
- configuring the wireless device 22 with at least two search space set groups (SSSGs);
- configuring the wireless device 22 with a timer for determining when to switch control channel monitoring between the at least two SSSGs; and
- optionally transmitting signaling on the control channel in accordance with the configuration of the timer.

Example B2. The method of Example B1, wherein the configuration of the timer is based at least in part on at least one of a channel occupancy time (COT) duration and a group common physical downlink control channel (GC-PDCCH) monitoring periodicity.

Example B3. The method of any one of Examples B1 and B2, further comprising:
- signaling an indication to switch PDCCH monitoring between the at least two SSSGs;
- signaling an indication to set or reset the timer to another value.

Example B4. The method of any one of Examples B 1-B4, wherein the signalling is via a PDCCH or radio resource control (RRC) signaling.

Example C1. A wireless device 22 configured to communicate with a network node 16, the wireless device 22 configured to, and/or comprising a radio interface 82 and/or processing circuitry 84 configured to:
- receive a configuration of at least two search space set groups (SSSGs);
- receive a configuration of a timer for determining when to switch control channel monitoring between the at least two SSSGs;
- monitor a first SSG of the at least two SSSGs; and
- one of switch to another of the at least two SSGs and continue monitoring the first SSG based at least in part on the timer.

Example C2. The wireless device 22 of Example C1, wherein the configuration of the timer is based at least in part on at least one of a channel occupancy time (COT) duration and a group common physical downlink control channel (GC-PDCCH) monitoring periodicity.

Example C3. The wireless device 22 of any one of Examples C1 and C2, wherein the wireless device 22 and/or the radio interface 82 and/or the processing circuitry 84 is further configured to:
- one of switch to another of the at least two SSGs and continue monitoring the first SSG based further on whether or not the wireless device 22 detects an indication to switch PDCCH monitoring between the at least two SSSGs while the timer is running; and
- receive an indication to set or reset the timer to another value and based on the indication set or reset the timer to the another value.

Example C4. The wireless device 22 of any one of Examples C1-C4, wherein the configuration is received via radio resource control (RRC) signaling.

Example D1. A method implemented in a wireless device 22, the method comprising:
- receiving a configuration of at least two search space set groups (SSSGs);
- receiving a configuration of a timer for determining when to switch control channel monitoring between the at least two SSSGs;
- monitoring a first SSG of the at least two SSSGs; and
- one of switching to another of the at least two SSGs and continuing monitoring the first SSG based at least in part on the timer.

Example D2. The method of Example D1, wherein the configuration of the timer is based at least in part on at least one of a channel occupancy time (COT) duration and a group common physical downlink control channel (GC-PDCCH) monitoring periodicity Example D3. The method of any one of Examples D1 and D2, further comprising:
- one of switching to another of the at least two SSGs and continuing monitoring the first SSG based further on whether or not the wireless device 22 detects an indication to switch PDCCH monitoring between the at least two SSSGs while the timer is running; and
- receiving an indication to set or reset the timer to another value and based on the indication set or reset the timer to the another value.

Example D4. The method of any one of Examples D1-D4, wherein the configuration is received via radio resource control (RRC) signaling.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A method performed by a network node, the method comprising:
configuring a wireless device with at least two search space set groups, SSSGs, a search space set group comprising the sets of search spaces which may be monitored during a given time period and the at least one other search space set group cannot be monitored during the same time period;
configuring the wireless device to switch control channel monitoring between the at least two SSSGs, the configuring of the wireless device to switch control channel monitoring between the at least two SSSGs corresponding to configuring the wireless device with a timer for determining when to switch control channel monitoring between the at least two SSSGs; and
causing transmission of signaling on the control channel in accordance with the configured switching of the control channel monitoring, the switching being configured to occur based on an indication for switching control channel monitoring one of when detected by the wireless device and on an expiration of the timer when the indication is not detected by the wireless device.

2. The method of claim 1, wherein the configuring of the wireless device to switch control channel monitoring between the at least two SSSGs further comprises an indication that triggers the start of the timer and is an instruction to monitor one of the at least two SSSGs.

3. The method of claim 1, wherein a value of the timer is based at least on one of a duration of a channel occupancy time, COT, a duration of a slot format and a periodicity of group common physical downlink control channel, GC-PDCCH.

4. The method of claim 1, wherein the indication for switching control channel monitoring is based at least on a value of a bit field in a downlink control information, DCI, format 2_0, wherein the bit field in the DCI format 2_0 indicates the wireless device to monitor a first SSSG of the at least two SSSGs based at least on the value of the bit field being equal to 0 and indicates the wireless device to monitor a second SSSG of the at least two SSSGs based at least on the value of the bit field being equal to 1.

5. A method performed by a wireless device, the method comprising:
receiving a configuration of at least two search space set groups, SSSGs, a search space set group comprising the sets of search spaces which may be monitored during a given time period and the at least one other search space set group cannot be monitored during the same time period;
receiving a configuration for switching control channel monitoring between the at least two SSSGs, the configuration comprising a timer for determining when to switch control channel monitoring between the at least two SSSGs;
switching to one of the at least two SSSGs for control channel monitoring in accordance with the configuration for switching control channel monitoring between the at least two SSSGs, the switching being performed based on an indication to switch control channel monitoring one of when detected and on an expiration of the timer when the indication is not detected by the wireless device.

6. The method of claim 5, wherein the configuration for switching control channel monitoring between the at least two SSSGs comprises an indication that triggers the start of the timer and is an instruction to monitor one of the at least two SSSGs.

7. The method of claim 5, wherein a value of the timer is based at least on one of a duration of a channel occupancy time, COT, a duration of a slot format and a periodicity of group common physical downlink control channel, GC-PDCCH.

8. The method of claim 5, wherein the indication for switching control channel monitoring is based at least on detection of downlink control information, DCI, format 2_0, wherein the bit field in the DCI format 2_0 indicates the wireless device to monitor a first SSSG of the at least two SSSGs based at least on the value of the bit field being equal to 0.

9. The method of claim 8, wherein the bit field in the DCI format 2_0 indicates the wireless device to monitor a second SSSG of the at least two SSSGs based at least on the value of the bit field being equal to 1.

10. A network node, comprising:
processing circuitry configured to:
configure a wireless device with at least two search space set groups, SSSGs, a search space set group comprising the sets of search spaces which may be monitored during a given time period and the at least one other search space set group cannot be monitored during the same time period;
configure the wireless device to switch control channel monitoring between the at least two SSSGs, the configuring of the wireless device to switch control channel monitoring between the at least two SSSGs corresponding to configuring the wireless device with a timer for determining when to switch control channel monitoring between the at least two SSSGs; and
cause transmission of signaling on the control channel in accordance with the configured switching of the control channel monitoring, the switching being configured to occur based on an indication for switching control channel monitoring one of when detected by the wireless device and on an expiration of the timer when the indication is not detected by the wireless device.

11. The network node of claim 10, wherein the configuring of the wireless device to switch control channel monitoring between the at least two SSSGs further comprises an indication that triggers the start of the timer and is an instruction to monitor one of the at least two SSSGs.

12. The network node of claim 10, wherein a value of the timer is based at least on one of a duration of a channel occupancy time, COT, a duration of a slot format and a periodicity of group common physical downlink control channel, GC-PDCCH.

13. The network node of claim 10, wherein the indication for switching control channel monitoring is based at least on a value of a bit field in a downlink control information, DCI, format 2_0, wherein one of:
the bit field in the DCI format 2_0 indicates to monitor a first SSSG of the at least two SSSGs based at least on the value of the bit field being equal to 0; and
the bit field in the DCI format 2_0 indicates to monitor a second SSSG of the at least two SSSGs based at least on the value of the bit field being equal to 1.

14. A wireless device, comprising:
processing circuitry configured to:
receive a configuration of at least two search space set groups, SSSGs, a search space set group comprising the sets of search spaces which may be monitored during a given time period and the at least one other search space set group cannot be monitored during the same time period;
receive a configuration for switching control channel monitoring between the at least two SSSGs, the configuration comprising a timer for determining when to switch control channel monitoring between the at least two SSSGs; and
switch to one of the at least two SSSGs for control channel monitoring in accordance with the configuration for switching control channel monitoring between the at least two SSSGs, the switching being performed based on an indication to switch control channel monitoring one of when detected or on an expiration of the timer when the indication is not detected by the wireless device.

15. The wireless device of claim 14, wherein the configuration for switching control channel monitoring between the at least two SSSGs comprises an indication that triggers the start of the timer is an instruction to monitor one of the at least two SSSGs.

16. The wireless device of claim 14, wherein a value of the timer is based at least on one of a duration of a channel occupancy time, COT, a duration of a slot format and a periodicity of group common physical downlink control channel, GC-PDCCH.

17. The wireless device of claim 14, wherein the indication for switching control channel monitoring is based at least on a value of a bit field in a downlink control information, DCI, format 2_0, wherein one of:
the bit field in the DCI format 2_0 indicates for the wireless device to monitor a first SSSG of the at least two SSSGs based at least on the value of the bit field being equal to 0; and
the bit field in the DCI format 2_0 indicates for the wireless device to monitor a second SSSG of the at least two SSSGs based at least on the value of the bit field being equal to 1.

* * * * *